No. 689,056. Patented Dec. 17, 1901.
E. BESSE & L. LUBIN.
APPARATUS FOR SOLDERING BOTTOMS OR TOPS OF TIN CANS, &c.
(Application filed Sept. 5, 1899.)
(No Model.) 2 Sheets—Sheet 1.
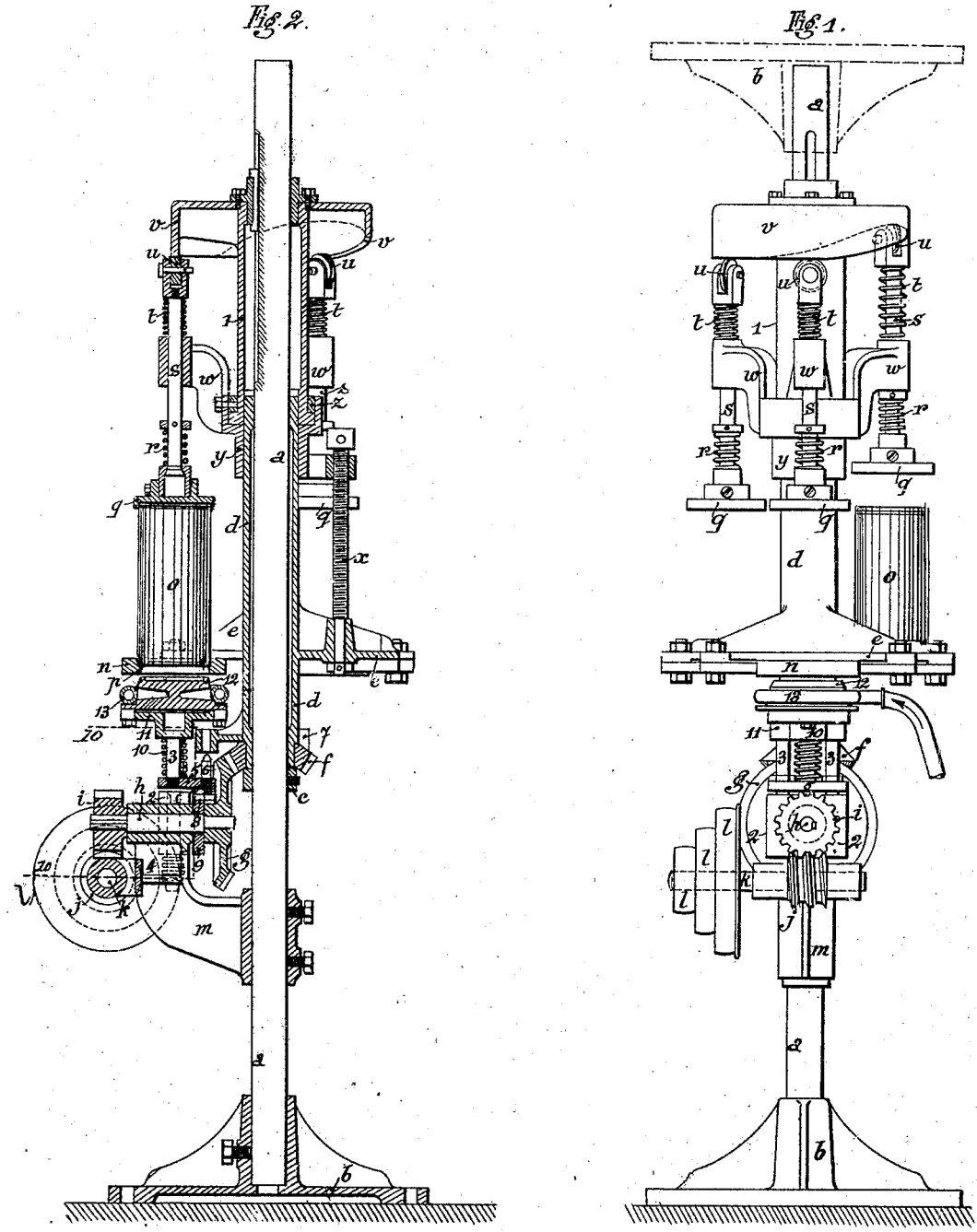
Witnesses:
Paul Hunter
J. B. Owens.
Inventors:
Emile Besse
Louis Lubin
By Munn
Attorneys No. 689,056. Patented Dec. 17, 1901.
E. BESSE & L. LUBIN.
APPARATUS FOR SOLDERING BOTTOMS OR TOPS OF TIN CANS, &c.
(Application filed Sept. 5, 1899.)
(No Model.) 2 Sheets—Sheet 2.

Witnesses:
Paul Hewitt
J. B. Owens.

Inventors:
Emile Besse
Louis Lubin
By Munn
Attorneys

UNITED STATES PATENT OFFICE.

EMILE BESSE AND LOUIS LUBIN, OF PARIS, FRANCE.

APPARATUS FOR SOLDERING BOTTOMS OR TOPS OF TIN CANS, &c.

SPECIFICATION forming part of Letters Patent No. 689,056, dated December 17, 1901.

Application filed September 5, 1899. Serial No. 729,551. (No model.)

*To all whom it may concern:*

Be it known that we, EMILE BESSE and LOUIS LUBIN, mechanical engineers, citizens of the Republic of France, residing at 97 Rue St. Lazare, Paris, France, have invented certain new and useful Improvements in Apparatus for Soldering the Bottoms or Tops of Tin Cans and the Like, of which the following is a specification.

Our invention relates to an apparatus for automatically soldering tin boxes for preserved food-stuffs and the like.

Our said invention is illustrated in the accompanying drawings, in which—

Figure 3:
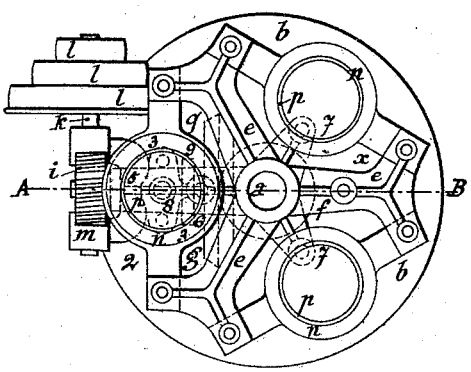
Figure 4:
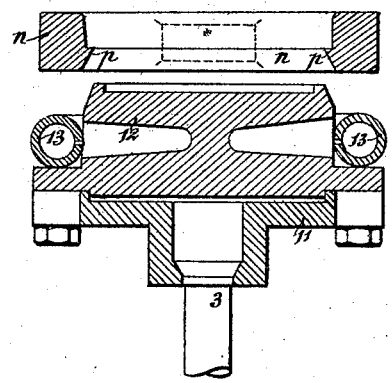
Figure 6:
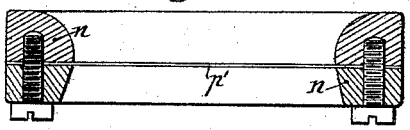
Figure 7:
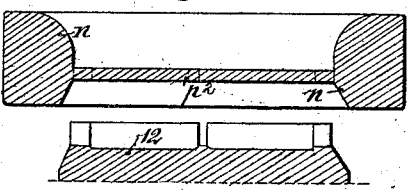
Figure 9:
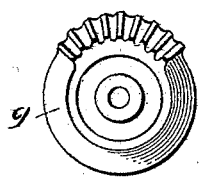
Figure 5:
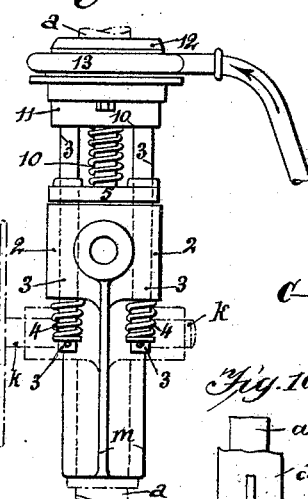
Figure 8:
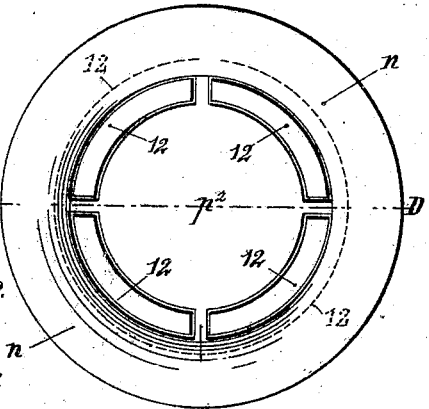
Figure 10:
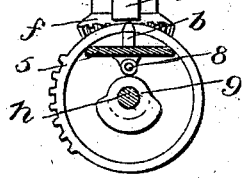

Figure 1 is an elevation, Fig. 2 a section on line A B, Fig. 3, and Fig. 3 a plan, respectively, of the apparatus. Fig. 4 is a sectional view of one form of the can-supporting frame and soldering-iron. Fig. 5 is a detail elevation of the soldering-iron and the means for supporting and operating it. Fig. 6 is a section of a second form of can-support. Fig. 7 is a section of a third form of can-support. Fig. 8 is a plan view thereof. Fig. 9 is a detail of the mutilated gear for driving the can-carrier, and Fig. 10 is a sectional elevation on the line 10 10 of Fig. 2.

The apparatus comprises a standard $a$, mounted in a base-plate $b$ and fitted with a ring $c$. On this latter is supported the sleeve $d$ of a cross-shaped frame $e$, Fig. 3, which is loose on the standard $a$. This cross-frame receives an intermittent rotary motion to the extent of one-third of a revolution through the intervention of a pinion $f$, keyed to the sleeve $d$ and gearing with a wheel $g$, having teeth only over one-third of its circumference (see Fig. 9) and which is mounted on a cross-shaft $h$. This wheel $g$ receives its motion through the intervention of a worm-wheel $i$ and worm $j$, provided on the shaft $k$, which is rotated by means of a belt fitted upon the step-pulley $l\,l\,l$, the whole of this mechanism being supported by a bracket $m$, fixed upon the standard $a$.

The cross-piece $e$ carries three frames or holders $n\,n\,n$, Fig. 3, of aluminium, (or other suitable metal which will not take solder,) conforming to the shape of the boxes $o$ to be soldered, which latter rest upon a projecting edge $p$, Fig. 4, or upon a thin aluminium plate $p'$, Fig. 6, or upon a thicker plate $p^2$, Fig. 7, which is connected to the frame or holder $n$ by three or four narrow radial strips in such a manner as to leave annular apertures between such plate and the interior of the holder (see Fig. 8) for the passage of the sectional rim of the soldering-iron. Above each of the frames $n$ there is arranged a plate $q$, Fig. 2, pressed downwardly by a spring $r$ and suspended from a rod $s$, which itself is pressed upwardly by a spring $t$ and which carries a roller $u$, running upon a cylindrical cam $v$. Each rod $s$ is mounted in a bracket $w$, Figs. 1 and 2, integral with a sleeve $y$, sliding on and revolving with the sleeve $d$. Thus the plates $q$ remain always in axial alinement with their respective holders. The cam $v$ cannot turn on the standard $a$, but is adapted to be raised or lowered thereon, (so as to suit the various heights of boxes to be soldered,) together with the brackets $w$, rods $s$, and the plates $q$. The whole of this mechanism is adjusted by means of the screw $x$, Fig. 2, mounted upon one of the arms of the cross-piece $e$ and screwing into a screw-nut provided on the socket $y$, carrying the brackets $w$. The socket $y$ turns freely upon the lower collar of the sleeve $l$, carrying the cam $v$, and is secured thereto by a ring $z$.

The bracket $m$ is fitted with two guide-boxes 2 2, Figs. 1, 2, and 5, in which rods or pins 3 3 slide. These rods or pins are forced downwardly by springs 4 4 and are united together by a bridge piece or flange 5, which carries a tooth 6, adapted to engage in one or other of three sockets 7, Figs. 2 and 3, integral with the sleeve $d$. The bridge-piece 5 also carries a roller 8, running on a cam 9, (see Fig. 10,) keyed to the shafts $h$. Upon the rods 3, supported by a spring 10, is a head 11, carrying the soldering-iron 12, which is heated by a circular gas-jet pipe 13. The soldering-iron is adapted to enter the frame or holder $n$, in which it can adjust itself and come into contact with the edges of the box $o$ to be soldered. Where the arrangement shown in Fig. 7 is employed, the soldering-iron 12 is cut to suit the center plate $p^2$ and passes through the annular apertures formed by the said plate and the holder $n$, so as to come into contact with the box. In the latter case it is advantageous for preventing the plate $p^2$ to absorb by conductibility a certain quantity of heat, whereby the time necessary for melting the solder would be objectionably increased, to somewhat lengthen (by suitably calculating for this purpose the outline of the lifting-cam 9) the upward stroke of the soldering-iron 12, so that the latter while pressing by its sectional rim against the periphery of the end plate of the box to be soldered lifts the same slightly above the plate $p^2$, which is thus quite insulated from the heated parts by an air-layer of a sufficient thickness for preventing it to be perceptibly heated.

The working of this improved soldering apparatus is as follows: In each of the holders $n$ in succession are placed the end plate and the body of a box $o$, the edge of which may have been prepared to receive the end plate and which is provided with a layer, or, better, a ring of solder. The boxes are brought into position one after the other by the action of the cross $e$ above the soldering-iron 12. As the boxes are brought around the roller $u$ of the rod $s$ running against the inclined portion of the cam $v$ causes the plate $q$ to descend so as to exercise an elastic pressure upon the box owing to its spring $r$. At the same time the rods 3 move upward through the intervention of the cam 9, while simultaneously therewith the cross-piece $e$ remains stationary, owing to the interruption in the teeth of the wheel $g$. The tooth 6 now engages in the socket 7 and locks the cross $e$ in position, whereupon the soldering-iron is brought with its annular edge into contact with the box and melts the solder by direct contact or through the thickness of plate $p$, Fig. 6. The cam 9 continues rotating. The spring 4 causes the soldering-iron 12 to return and at the same time disengages the tooth 6, and thus unlocks the cross-piece $e$. Thereupon the wheel reëngages with the pinion $f$ and causes the cross-piece $e$ to rotate a third of a revolution. During this period of rotation the roller $u$ runs upon a horizontal portion of the cam $v$ for a sufficiently long time to permit the solder to solidify, afterward running again upon an incline. The plate $q$ is then raised and allows the soldered box to be removed and replaced by another box. During this time the next box is treated in the same manner, and this continues. With the arrangement in Fig. 7, where the box is supported upon an aluminium plate $p^2$, attached by a narrow piece to the holder $n$, it is advantageous to slightly increase the stroke of the soldering-iron 12 by suitably shaping the cam 9, so as to cause the iron while being applied to the bottom of the box to lift the latter a little off the plate $p^2$. In this manner the said plate cannot absorb any of the heat through contact with the box required for the fusion of the solder, and thus the working speed is augmented.

The improved apparatus may also serve in soldering the tops or lids on plain boxes, (which it would be impossible to turn upside down without disturbing their contents.) It suffices in this case to reverse the apparatus, as indicated by dot-and-dash lines—i. e., with the foot-plate $b$ turned upward, as shown in Fig. 1. The apparatus may be provided with a number of lower or upper holders for boxes and the form or shape of such holders may be varied to suit the form of boxes for soldering.

Having now particularly described and ascertained the nature of our said invention and in what manner the same is to be performed, we declare that what we claim is—

1. The combination with a standard, of a sleeve mounted to turn thereon, a cam mounted on the standard and incapable of turning thereon, plungers carried by the sleeve and engaging the cam, holders also carried by the sleeve and turning therewith, a soldering-iron mounted beneath the holders and movable toward and from the same, and means for driving the soldering-iron in unison with the holders.

2. The combination with a standard, of a sleeve mounted to turn thereon, a circular cam mounted on the standard above the sleeve and incapable of turning, means carried by the sleeve and actuated by the cam to hold the cans in place, a holder carried by the sleeve on which holder the cans are placed, a soldering-iron adapted to move toward and from the holder, and gearing for turning the sleeve and driving the soldering-iron.

3. A can-soldering machine, having a can-holder comprising an annular main portion and a relatively thin plate or web extending throughout the area thereof and formed with openings therein adjacent to the edge of the plate, and a soldering-iron formed with upwardly-projected portions adapted to extend through the openings in the said plate to contact with the can.

4. The combination of a standard, a sleeve mounted loosely thereon, a can-carrier fastened on the sleeve, a transverse drive-shaft sustained on the standard below the sleeve, gearing for intermittently driving the sleeve from the drive-shaft, a cam fastened on the drive-shaft to turn therewith, and a soldering device arranged under the can-carrier and movable by the action of the cam toward and from the can-holder.

5. The combination of a standard, a sleeve arranged to turn thereon, a can-holder held by the sleeve, a drive-shaft, gearing for intermittently driving the sleeve from the drive-shaft, a cam driven from the drive-shaft, a soldering device having a projected part and moved toward and from the can-holder by the action of the cam, and a socket having connection with the sleeve and arranged to receive said projected part of the soldering device when the soldering device is moved to active position, whereby to stop the movement of the sleeve.

6. A soldering-machine having a standard, a can-holder arranged to turn around the same, mechanism for intermittently driving the can-holder, a stationary cam arranged above the can-holder, a plunger mounted to turn with the can-holder and actuated by the cam, for the purpose specified, and a connection between the can-holder and the cam to adjust the relative positions of these parts.

7. In a can-soldering machine, the combination of a standard, a sleeve arranged to turn around the same, a second sleeve having turning connection with the first sleeve, the second sleeve being splined on the standard, a cam carried by the second sleeve, a can-holder carried by the first sleeve, a connection between the two sleeves to adjust the relative positions thereof, a plunger actuated by the cam of the second-named sleeve, said plunger working with the can-holder, means for intermittently driving the first-named sleeve, and a driven soldering device movable toward and from the can-holder in time with the intermittent movement of the said first-named sleeve.

In witness whereof we have hereunto set our hands in presence of two witnesses.

EMILE BESSE.
LOUIS LUBIN.

Witnesses:
GEORGES DELOM,
EDWARD P. MACLEAN.